United States Patent [19]

Poole

[11] 4,166,280
[45] Aug. 28, 1979

[54] HIGH PERFORMANCE TELEVISION COLOR CAMERA EMPLOYING A CAMERA TUBE AND SOLID STATE SENSORS

[75] Inventor: Burnet M. Poole, Morgan Hill, Calif.

[73] Assignee: Ampex Corporation, Redwood City, Calif.

[21] Appl. No.: 848,482

[22] Filed: Nov. 4, 1977

[51] Int. Cl.² .................... H04N 9/04; H04N 9/07; H04N 9/09
[52] U.S. Cl. ................................ 358/51; 358/43; 358/50; 358/52; 358/41
[58] Field of Search ................ 358/43, 50–52, 358/41, 213, 55, 44; 315/370, 371

[56] References Cited

U.S. PATENT DOCUMENTS

| 2,641,642 | 6/1953 | Behrend | 358/43 |
| 2,858,362 | 10/1958 | Bedford | 358/50 |
| 3,546,370 | 12/1970 | Kimball | 358/52 |
| 3,740,608 | 6/1973 | Manber et al. | 315/370 |
| 3,757,261 | 9/1973 | Kline | 315/276 |
| 4,007,488 | 2/1977 | Morishita et al. | 358/213 |

*Primary Examiner*—John C. Martin
*Attorney, Agent, or Firm*—Robert G. Clay; George B. Almeida

[57] ABSTRACT

A conventional, high resolution camera pickup tube is employed to generate the luminance signal corresponding to the greater bandwidth luminance component of a composite video signal. At least one low resolution, solid state sensor is combined with the tube to generate the red, green and blue color signals corresponding to the lower bandwidth red, green and blue color components of the video signal. A scan adjustment circuit precisely conforms the tube scan raster with the near-perfect geometry of the solid state sensor array. A clocking circuit synchronizes the scan rate of the sensors with that of the pickup tube. Gamma correction, matrixing and encoding are provided via video processor circuitry to generate the broadcast quality, composite video output.

19 Claims, 22 Drawing Figures

FIG_1

FIG_2

FIG_3

FIG 4

| | COLUMN 1<br>NAME OF FUNCTION | COLUMN 2<br>METHOD OF GENERATION | COLUMN 3<br>SCAN WAVEFORM | COLUMN 4<br>PATTERN SCANNED ON TARGET OF TUBE | COLUMN 5<br>EFFECT ON LINEARITY CHART REPRODUCED ON MONITOR |
|---|---|---|---|---|---|
| FIG_5A | VERTICAL CENTERING | ADD DC TO VERTICAL SCAN | 60 Hz | | |
| FIG_5B | HORIZONTAL CENTERING | ADD DC TO HORIZONTAL SCAN | 15 kHz | | |
| FIG_5C | HEIGHT | ADD VERTICAL RAMP TO VERTICAL SCAN | 60 Hz | | |
| FIG_5D | WIDTH | ADD HORIZONTAL RAMP TO HORIZONTAL SCAN | 15 kHz | | |
| FIG_5E | VERTICAL SKEW | ADD HORIZONTAL RAMP TO VERTICAL SCAN | 60 Hz | | |
| FIG_5F | HORIZONTAL SKEW | ADD VERTICAL RAMP TO HORIZONTAL SCAN | 60 Hz | | |
| FIG_5G | VERTICAL LINEARITY | ADD VERTICAL PARABOLA TO VERTICAL SCAN | 60 Hz | | |
| FIG_5H | HORIZONTAL LINEARITY | ADD HORIZONTAL PARABOLA TO HORIZONTAL SCAN | 15 kHz | | |

| | COLUMN 1<br>NAME OF FUNCTION | COLUMN 2<br>METHOD OF GENERATION | COLUMN 3<br>SCAN WAVEFORM | COLUMN 4<br>PATTERN SCANNED ON TARGET OF TUBE | COLUMN 5<br>EFFECT ON LINEARITY CHART REPRODUCED ON MONITOR |
|---|---|---|---|---|---|
| FIG_6A | VERTICAL ESS | ADD VERTICAL ESS TO VERTICAL SCAN | 60 Hz | | |
| FIG_6B | HORIZONTAL ESS | ADD HORIZONTAL ESS TO HORIZONTAL SCAN | 15 kHz | | |
| FIG_6C | HORIZONTAL-LINE BOWING | ADD HORIZONTAL PARABOLA TO VERTICAL SCAN | 60 Hz | | |
| FIG_6D | VERTICAL-LINE BOWING | ADD VERTICAL PARABOLA TO HORIZONTAL SCAN | 60 Hz | | |
| FIG_6E | SIDEWAYS KEYSTONE | MULTIPLY VERTICAL RAMP BY HORIZONTAL RAMP, AND ADD IT TO VERTICAL SCAN | 60 Hz | | |
| FIG_6F | UPRIGHT KEYSTONE | MULTIPLY HORIZONTAL RAMP BY VERTICAL RAMP, AND ADD IT TO HORIZONTAL SCAN | 60 Hz | | |
| FIG_6G | HORIZONTAL PINCUSHIONING | MULTIPLY VERTICAL RAMP BY HORIZONTAL PARABOLA AND ADD IT TO VERTICAL SCAN | 60 Hz | | |
| FIG_6H | VERTICAL PINCUSHIONING | MULTIPLY HORIZONTAL RAMP BY VERTICAL PARABOLA, AND ADD IT TO HORIZONTAL SCAN | 60 Hz | | |

FIG_7

FIG_8

HIGH PERFORMANCE TELEVISION COLOR CAMERA EMPLOYING A CAMERA TUBE AND SOLID STATE SENSORS

BACKGROUND OF THE INVENTION

1. Field

The invention relates to television color cameras, and particularly to a hybrid color camera configuration employing a camera pickup tube in combination with a selected number of solid state sensors.

2. Prior Art

At present, practical color cameras can be classified into several basic types. A first type employs one or two camera tubes and color analysis is performed by a rotating disc containing red, green and blue, or red and blue, filters interposed between the camera optical lens and the camera tube. As the disc rotates, successive filters intercept the light directed to the tube target to generate signals corresponding to the red, blue (and green) color components of the scene. A typical camera is described in "New Two-Tube Color Cameras For Broadcast Use", B. M. Poole, Tech. Papers, NAB Eng. Conf., Mar. 23-26, 1969, pgs. 238-244.

In another type of camera, one tube is used and each point of the optical image is split into, for example, three color components by interposing an array of focused fine color filter stripes in the optical path. Each image point produces charged target areas corresponding to the color component points which are scanned by the tube electron beam, to generate a signal which sequentially describes the area charges. Electrical processing derives signals corresponding to the color components. Typical of such a one-tube camera is that described in the article "A Single Vidicon TV Camera System", Journal of the SMPTE, Vol. 79, April 1970, pgs. 326-330.

Other types of cameras employ two, three or four camera tubes, wherein the color components of the optical image are formed separately and the related signals generated continuously. The light from the camera lens is split into red, green and/or blue color components via dichroic mirrors, where each component forms an image on the camera tube target. Typical three and four tube cameras are described in; Ampex Corp. Catalog No. 1809173-01, "BC-230B, Manual of Theory of Operation", June 1975; Cohu Electronics, Inc., "Operating and Maintenance Instructions For 9800 Series Color Video Encoder", June 1970; RCA Catalog B.2000, "Transistorized Live Color Camera, Type TK-42", 1965; Sound and Vision Broadcasting, "A New Four-Tube Colour TV Camera", Vol. 7, No. 1, Spring 1966, pgs. 8-21.

In multiple tube cameras, the images formed on the targets must have correct spatial correspondence relative to each other to ensure that the color component pictures at the display are in register; i.e., spatially superimposed at all points. Consequently, the color analysis arrangements and the camera tubes must be very stable mechanically, and the scanning patterns traced on the tube targets must be as stable and identical as possible.

In any camera, the characteristics of a camera tube that relates output signal and scene brightness together with that of any gamma corrector used, must be such that over a large range of scene brightness, an approximately linear relationship exists between a change of scene brightness and the corresponding change at the display. Therefore, in a camera incorporating several tubes (and several gamma correctors), the combined characteristics of one tube and its associated corrector must be well matched to the others. Thus the deflection assemblies for the pickup tubes are first computer-matched to provide yoke and tube combinations of similar characteristics, and thus scan raster geometries which are as similar as possible. In addition, one tube (for example, the green-channel tube) may be selected as a master tube/channel, and various analog-waveform driving signals are applied via suitable electronics to match the scan rasters of the remaining slave tube, or tubes, of corresponding slave channels, with the master tube raster, as generally described in the multiple tube references of previous mention.

None of the above techniques are capable of providing the degree of accuracy required to cause a pickup tube to generate a scan raster with the near perfect physical geometry of a solid state image sensor. In addition, most of the multiple tube cameras are bulky and heavy, require skilled operation, while lacking sensitivity and economy of operation.

Recent developments in the state-of-the-art of solid-state sensors have spurred interest in their use in relatively low resolution electronic news gathering (ENG) color cameras in place of the conventional Plumbicon, Vidicon, Saticon, etc., pickup tubes. By way of example, typical ENG color cameras employing solid state sensors are described in; "All-Solid-State Camera for the 525-Line Television Format", IEEE Transactions on Electron Devices, Vol. ED-23, No. 2 February 1976, pgs. 183–189; "Solid State Image Sensors: Improvements in Signal Processing Techniques", BBC Research Dept., Report BBC RD 1976/4, January 1976; RCA Brochure on the SID 51232, printed Jan. 1975. However, a typical broadcast quality television color camera system requires a luminance component of 4.2 megaHertz bandwidth or better. This parameter imposes the requirement that a solid state array have a geometric configuration of the order of 600×488 photosensitive elements. However, the geometry of presently available state-of-the-art solid state sensor arrays, and those in the foreseeable future, provide only on the order of 320 by 244 photosensitive elements. Typical thereof, a photosensitive element of one type of such an array may contain 2 MOS transistors, 2 capacitors and 2 reverse biased photo diodes, whereby it is very difficult to accurately manufacture arrays with the greater number of elements required for broadcast quality color television use. It is estimated that several years development time is needed before the advent of such high resolution solid state sensors. Thus, the development of an RGB color camera of broadcast quality utilizing solid state devices alone is improbable in the immediate future.

However, an array with as few as 188 by 244 elements offers sufficient resolution to allow generation of the red, green and blue chroma signals, or of the R-Y and B-Y color components, since the chroma signals require on the order of 1 megaHertz bandwidth, or less. Accordingly, the specific combination of a pickup tube with presently available solid state sensors having a relatively small number of photosensitive elements, allows the development of a light weight, broadcast quality color camera of improved configuration.

When utilizing a pickup tube with solid state sensor devices, problems in registration arise due to the difference between the near perfect array geometry of the accurately manufactured solid state devices and the relatively inaccurate scan raster of the tube, which cause, in turn, loss of resolution, color edge effects, etc. Thus, means must be provided to correct the tube scan raster to precisely conform same to the near perfect array geometry of the solid state sensors. This presents a different problem than that of prior art multiple-tube cameras as, for example, the four tube camera, wherein the various tube scan rasters need only be matched to each other, not made to conform to near-perfect array geometry.

SUMMARY OF THE INVENTION

The invention encompasses a hybrid, broadcast quality color camera employing a single high resolution camera pickup tube in combination with one or more presently-available low resolution solid state sensors. The arrangement provides the advantages of lighter weight, self-registration of the solid state sensors which require only mechanical alignment, equal-resolution response, equal gamma and equal bandwidth to eliminate color fringing and edge effects, and improved sensitivity and signal-to-noise advantages, particularly in the event the single vacuum pickup tube includes image intensification.

To this end, the invention contemplates a single Plumbicon, Saticon, etc., camera pickup to provide the high resolution luminance signal, in combination with one or more solid state sensors which provide a selected form of the low resolution red, green and blue color signals. The output from the tube's preamplifier is coupled to an associated video processor including gain, pedestal and gamma correction circuits, which generates a selected form of the luminance (Y) signal. The solid state sensor or sensors also are coupled to an associated video processor which includes gain, pedestal and gamma correction circuits. The luminance and chrominance signals are introduced to a matrix/encoder circuit which provides the broadcast quality encoded composite video signal.

A clock circuit is coupled to the sensor, or sensors, and provides clocking pulses to match the scan rates of the one or more sensors with that of the tube. A scan adjustment circuit is coupled to the deflection coils of the pickup tube, and provide the luminance channel with highly-sophisticated scan correction electronics for correcting the various raster inaccuracies inherent in the tube/yoke combination. More particularly, the adjustment circuit directs the tube scanning means to generate a near-perfect scan raster geometry to accordingly provide the precise registration required between the tube scan raster and the near-perfect geometry of the solid state sensors. The use of precise analog correction waveforms generated via the scan adjustment circuit to direct the tube scanning means to generate a near-perfect scan raster geometry, allows the combination of a tube and one or more solid state sensors to define a hybrid video color camera of broadcast quality.

DESCRIPTION OF THE PREFERRED EMBODIMENT

Figure 1:
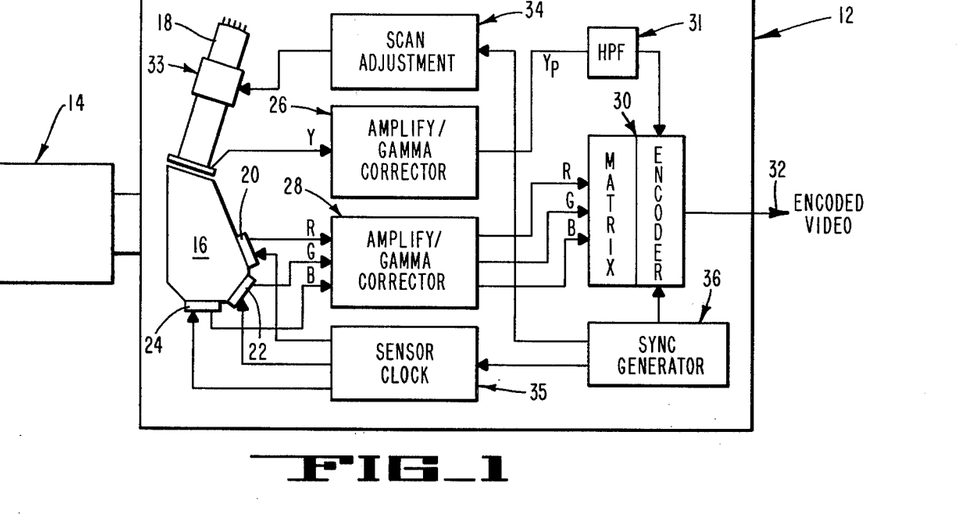
FIG. 1 is a block diagram exemplifying one combination of a hybrid color camera employing three solid state sensors.

Referring to FIG. 1, a hybrid camera housing 12 includes a suitable lens 14 and, by way of example only, a (four-way) beam splitter prism 16 for separating the luminance (Y), and the red (R), green (G) and blue (B) colors. A camera pickup tube 18 is disposed against the prism to receive the luminance, and a plurality of solid state image sensors 20, 22 and 24 of near-perfect array geometry are disposed against the prism to receive the red, green and blue color images, respectively. The Y signal generated by the target of the pickup tube 18 is introduced to an amplify/gamma corrector means 26, while the R, G, B signals are introduced to an amplify/gamma corrector means 28. The resulting photopic luminance signal ($Y_P$) is introduced to an encoder portion of matrix/encoder means 30 via a high pass filter 31, and the processed chrominance signals, R, G, B are introduced to a matrix portion of the matrix/encoder means 30. The encoder portion of the means 30 in turn generates an encoded composite video output signal on line 32. A scan adjustment means 34 is coupled to the deflection coils of the yoke 33 of the pickup tube 18 and corrects the scan raster thereof to cause it to conform to a near-perfect geometry such as that inherent in the solid state sensors 20, 22, 24. A solid-state-sensor clock circuit 35 is coupled to the sensors 20, 22, 24 and provides scan timing at a selected scan rate commensurate with the scan rate of the pickup tube 18. The timing for the camera system is provided via a sync generator 36 coupled to the clock circuit 35, to the scan adjustment means 34, and to the matrix/encoder means 30.

Figure 2:
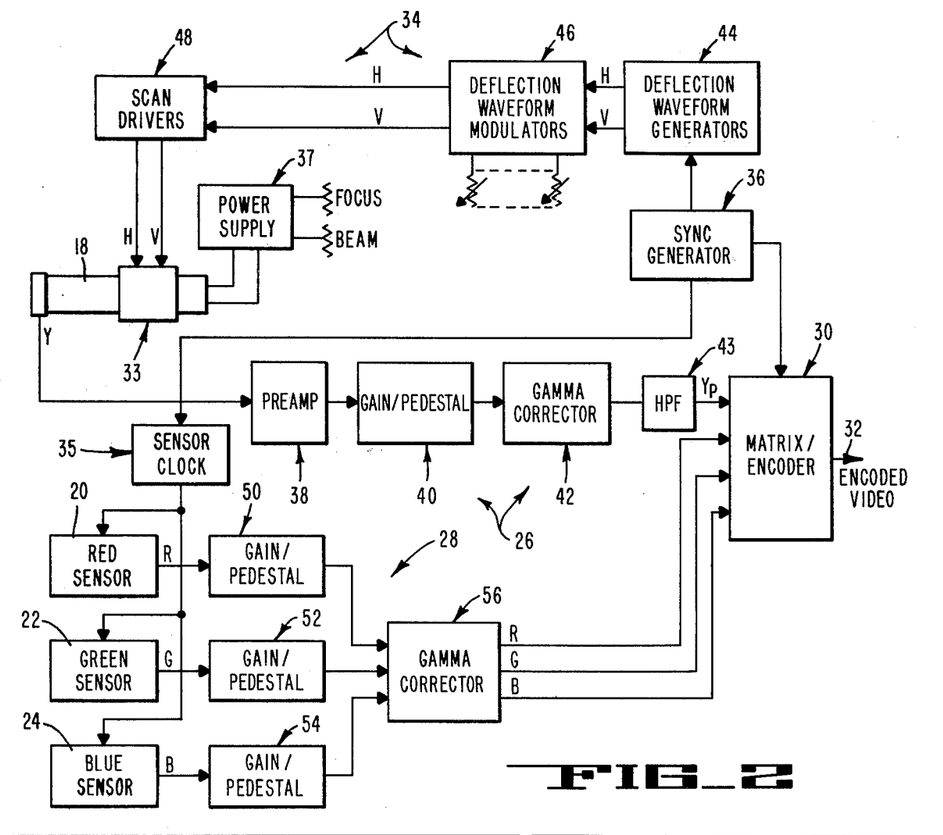
FIG. 2 is a block diagram exemplifying the system, and particularly the circuity of FIG. 1, in greater detail.

In FIG. 2, wherein like components of FIG. 1 are similarly numbered, the pickup tube 18 is coupled to a suitable power supply 37, and to the scan adjustment means 34, herein further shown as deflection waveform generator means 44, deflection waveform modulator means 46, and scan driver means 48. The luminance signal Y is introduced to a preamplifier means 38 of the amplify/gamma corrector means 26 of previous mention. The means 26 further includes a gain/pedestal circuit 40 coupled to the preamplifier 38, a gamma corrector circuit 42 coupled to the circuit 40, and an (optional) high pass filter 43 coupled to the gamma circuit 42. The high pass filter 43 may be inserted to reduce the Livingstone color error as per common practice. The resulting processed photopic luminance signal $Y_P$ is supplied to the matrix/encoder means 30.

The horizontal (H) and vertical (V) coils (not shown) of the yoke 33 of the pickup tube 18 are coupled to the scan driver means 48 of the scan adjustment means 34, which drivers in turn are supplied via the modulator means 46 with various superimposed H and superimposed V scan waveforms generated by separate H and V deflection waveform generators within generator means 44. The separate superimposed H and V waveforms are applied to the tube 18 as composite H and composite V scan correction waveforms which direct the tube scanning beam to generate a near-perfect scan raster geometry, whereby the tube scan raster may conform to the near-perfect geometry of the soild state image sensors 20, 22, 24 in accordance with the invention.

The solid state image sensors 20, 22, 24 are coupled to the clock circuit 35, which is coupled to the sync generator 36, wherein the combination supplies the scan timing signals for clocking the sensors at a selected scan rate commensurate with the scan rate of the pickup tube 18. By way of example, the tube scans at a rate of 15,750 scanning lines per second. Thus the clock circuit 35 supplies pulses which clock the sensors 20, 22, 24 with a clock pulse rate which is 15,750 pulses per second times the number of sensor elements in one (horizontal) row of sensors. Only the first clock pulse for each row is referenced to the start of each scanning line for the tube; hence the need to maintain perfect linearity and geometry with the tube and yoke assembly so that intermediate points scanned in the tube are coincident with those scanned in the sensor.

The sensors 20, 22, 24 in turn are coupled to respective gain/pedestal circuits 50, 52, 54 and thence to a gamma corrector circuit 56, wherein the circuits 50, 52, 54, 56 define the amplify/gamma corrector means 28 of FIG. 1. The RGB color signals are coupled to the matrix/encoder means 30 along with the photopic luminance signal from the gamma corrector circuit 42. Means 30 generates the encoded video color signal.

No further description is made herein of the processor, matrix and encoder circuits 38–42, 50–56 and 30, since these circuits are generally known in the art per se. Typical circuits 38–42 are shown in the Ampex Corp. Catalog No. 1809173-01, BC-230B of previous mention. Likewise, typical circuits 50–56 are shown in the BBC Research Dept. Series Manual and an example of the clock circuit 35 is shown in the RCA SID report, also of previous mention.

Although the block diagrams of FIGS. 1 and 2 depict a hybrid camera configuration having one tube and three solid state sensors; it is to be understood that various other combinations are contemplated within the invention concept; i.e., one or more solid state sensor devices and associated adjunct apparatus may be used to generate the related luminance and chrominance signals as further described, for example, with reference to FIGS. 7 and 8 below.

Figure 3:
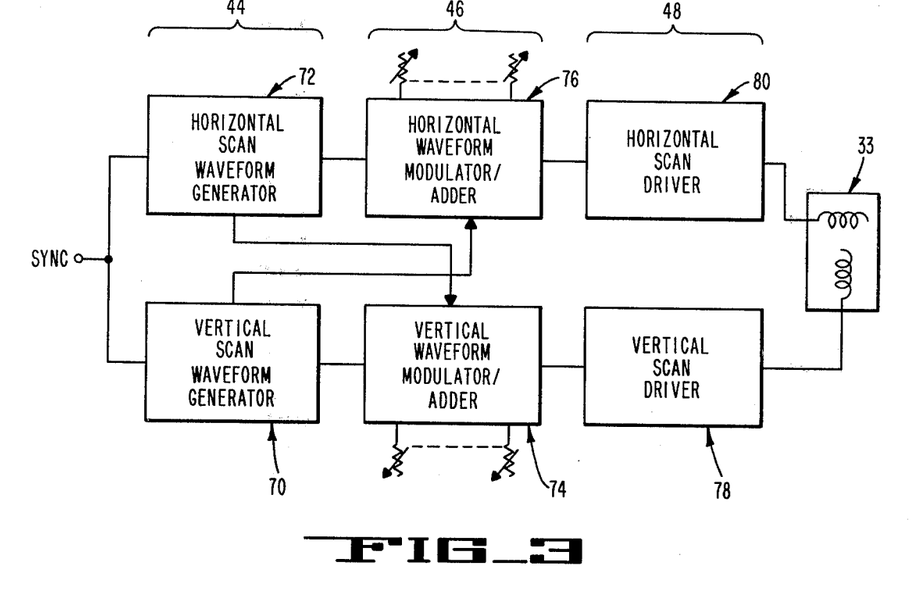
FIG. 3 is a block diagram exemplying the scan adjustment circuit of the system of FIGS. 1, 2, which directs the generation of a near perfect scan raster geometry for the tube.

FIG. 3 depicts briefly the scan adjustment means 34 of FIGS. 1, 2 coupled to the yoke 33 of the pickup tube 18. V and H scan waveform generators 70, 72 are intercoupled to each of V and H waveform modulator/adder means 74, 76 in respective vertical and horizontal channels. The modulated/summed waveforms are fed from means 74, 76 to V and H scan drivers 78, 80 respectively. The latter two define the driver means 48 which drive the V and H deflection coils of the yoke 33 accordingly. The waveform generators 70, 72 provide the means (44) for generating various vertical and horizontal driving waveforms such as, for example, sawtooth, parabola and ess waveforms, of mirror image positive and negative phases. The modulator/adder means 74, 76 provides the deflection waveform modulator means 46 for superimposing various ones of the generated waveforms in the selected proportions and phases commensurate with the type and degree of scan correction required to correct raster inaccuracies for a specific pickup tube.

Figure 4:
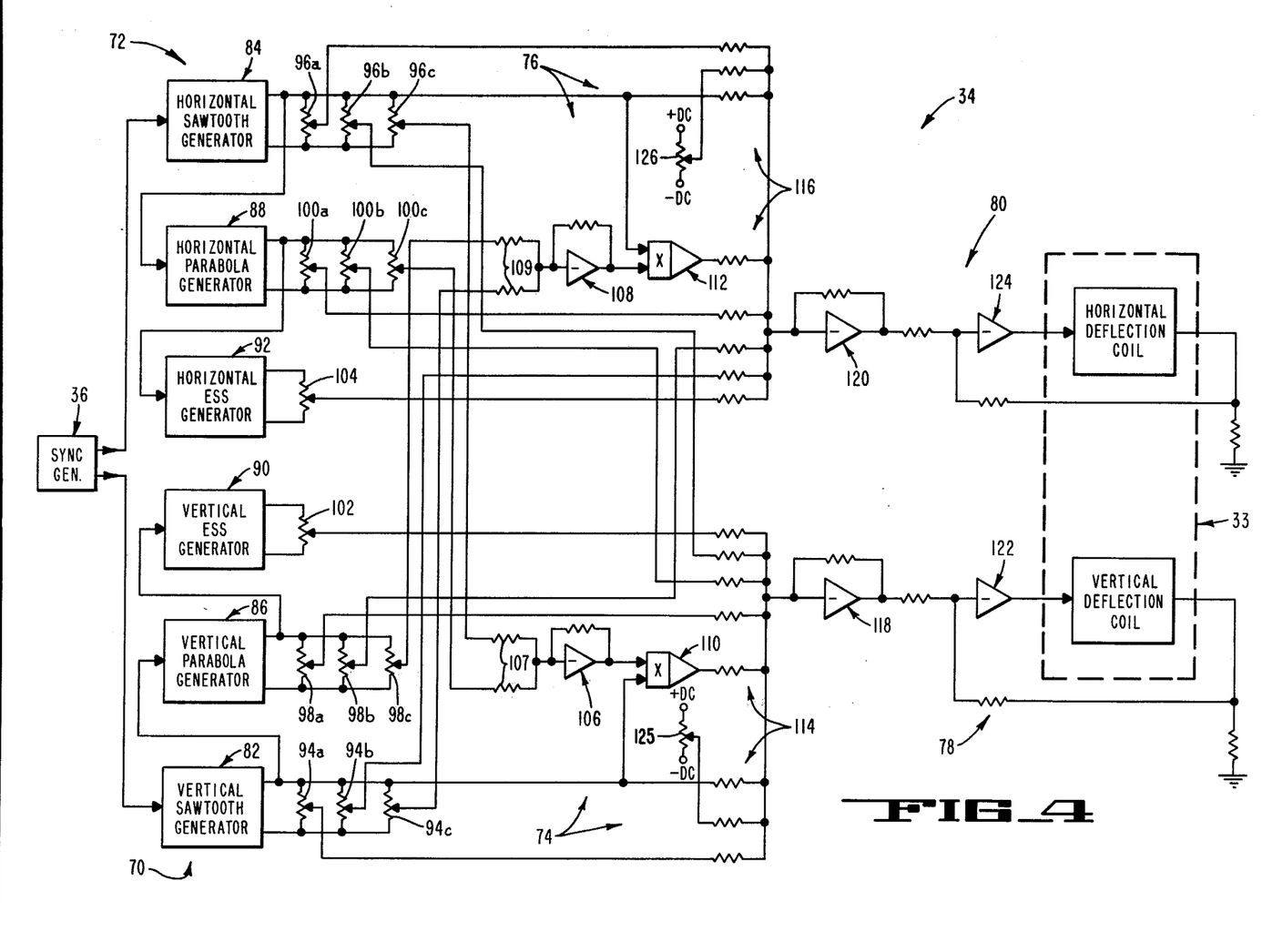
FIG. 4 is a schematic diagram depicting in greater detail the scan adjustment circuit of FIG. 3.

FIG. 4 exemplifies one schematic implementation of the scan adjustment means 34 of FIGS. 1–3. The camera sync generator 36 of FIG. 2 provides inter alia the conventional vertical and horizontal drive pulses to respective V and H channels of the scan adjustment means 34. The electronics in both channels are similar and include respective V and H sawtooth generators 82, 84, V and H parabola generators 86, 88 and V and H ess curve generators 90, 92. Each of the generators 82, 84, 86, 88, 90 and 92 provides two outputs, viz., positive and negative phase waveforms defining sawtooth, parabola and ess functions, wherein one phase is the mirror image of the other. The pair of outputs from sawtooth generators 82, 84 are coupled across respective multiple V and H potentiometers in parallel. In the vertical channel, the potentiometers comprise a V size adjust 94a, H skew adjust 94b and upright keystone adjust 94c, and in the horizontal channel an H size adjust 96a, V skew adjust 96b and sideways keystone adjust 96c. Likewise, the outputs from V and H parabola generators 86, 88 are coupled across respective multiple V and H potentiometers in parallel; i.e., in the vertical channel, V linearity adjust 98a, V line bowing adjust 98b and V pincushion adjust 98c, and in the horizontal channel, H linearity adjust 100a, H line bowing adjust 100b and H pincushion adjust 100c, respectively. The outputs from the ess generators 90, 92 are coupled across V ess adjust and H ess adjust potentiometers 102, 104 respectively. The positive phase outputs of the V and H sawtooth generators 82, 84 are fed to the V and H parabola generators 86, 88, and the positive phase outputs of the latter are, in turn, fed to the V and H ess generators 90, 92 respectively, The parabola generators 86, 88 are integrating circuits which perform one stage of integration on the sawtooth waveform to generate the parabola function. The ess generators 90, 92 are also integrating circuits which perform a second stage of integration, i.e., integrate the parabola function, to generate the ess function.

The H and V channels also include respective modulating waveform adder amplifiers 106, 108, sawtooth modulators 110, 112 and respective series of multiple summing resistors 114, 116. The amplifiers 106, 108 are inverting, operational amplifiers with a zero impedance summing junction, wherein the input to V amplifier 106 is coupled to the movable contacts of the sideways keystone and the H pincushion adjust potentiometers 96c and 100c via summing resistors 107. The H amplifier 108 input is coupled to the movable contacts of the upright keystone and the V pincushion adjust potentiometers 94c, 98c via summing resistors 109. The sawtooth modulators 110, 112 are linear four-quadrant multipliers, one input thereof being coupled to the respective amplifiers 106, 108, with the other inputs thereof being coupled to the positive phase outputs of the V and H sawtooth generators 82 and 84 respectively. The outputs of the V and H sawtooth modulators 110, 112 are coupled to V and H scan waveform adder amplifiers 118, 120 respectively via summing resistors. Resistor series 114, 116 and the adder amplifiers 118, 120 together define the adder portion of the modulator/adder means 74, 76 of FIG. 3. The adder amplifiers 106, 108 are required to sum the keystone and pincushion waveforms prior to their introduction to the sawtooth modulators 110, 112. If a single waveform is fed to the modulators, the adder amplifiers 106, 108 may be omitted.

The V and H scanning voltage waveforms generated via the V and H adder amplifiers 118, 120 are fed to V and H scan driver amplifiers 122, 124 respectively, and thence to the V and H scan coils of the pickup tube yoke 33 as the separate, precisely corrected V and H deflection current waveforms. The latter provide the pickup tube 18 with the near perfect raster scan geometry in accordance with the invention.

The movable contacts of the V and H size adjust potentiometers 94a, 96a are coupled to the V and H adder amplifiers 118, 120 respectively via summing resistors in series 114, 116. Likewise, the movable contacts of the V and H ess adjust potentiometers 102, 104, and of the V and H linearity adjust potentiometers 98a, 100a, are coupled to the V and H adder amplifiers 118, 120 via respective summing resistors. The movable contacts of the V-line and H-line bowing adjust potentiometers 98b, 100b are coupled via summing resistors to the opposite channel (H and V) adder amplifiers 120, 118, respectively. The movable contacts of the H and V skew adjust potentiometers 94b, 96b, which are in the V and H channels respectively, are coupled to the H and V adder amplifiers 120, 118 respectively via summing resistors. The positive phase outputs of the V and H sawtooth generators 82, 84 are also coupled via summing resistors to the adder amplifiers 118, 120 and provide the basic V and H sawtooth waveforms.

V and H centering adjust potentiometers 125, 126 have a DC voltage applied, and the movable contacts thereof are coupled via summing resistors to the adder amplifiers 118, 120 respectively.

The waveform generators 82, 84, 86, 88, 90 and 92 are not further described herein since they are generally known in the art per se, as shown for example in the BBC Engineering Training Manual, "Television Engineering, Principles and Practice", Vol. 3, 1957, Iliffe and Sons, Ltd., London.

Thus as shown by way of example only, eight correction waveforms are supplied by each of the V and H channels of electronics, and are selectively added to each other via the modulator/adder means 74, 76, to supply the precisely corrected composite V and composite H deflection current waveforms to the tube yoke 33. To this end, selected proportions and phases of the various correction waveforms are added to the basic vertical and horizontal sawtooth scan waveforms, as selected via the associated adjust potentiometers, to select the desired size and to correct for the various scan errors associated with camera pickup tubes known as centering, skewing, linearity, ess, line bowing, keystoning and pincushioning. These various scan errors and their various correction waveforms are individually shown and described with reference to FIGS. 5A-5H and 6A-6H, infra.

Accordingly, in operation, the sync generator 36 commonly used in video color cameras, herein supplies the vertical and horizontal drive pulses commensurate with vertical and horizontal flyback, for timing the correction waveform generation with the pickup tube vertical and horizontal active scanning intervals. In response to the sync generator 36, the plurality of generators 82-92 generate two phases of vertical and two phases of horizontal sawtooths, two phases of V and two phases of H parabolas and two phases of V and two phases of H ess waveforms. The various outputs from the generators 82-92 are coupled across the potentiometers 94, 96, 98, 100, 102, 104 whereby select adjustment of the movable contacts thereof provides; a positive or a negative phase; a selected proportion of positve and negative phase amplitudes and thus a waveform of one or the other phase with reduced amplitude; or no output at all if the movable contacts are set in the middle since the mirror image phases cancel each other out. Thus the potentiometers allow the selection of any amount of either phase of any of the functions which are to be employed to correct for scan errors. In turn, the summing resistors 114, 116 and scan waveform adder amplifiers 118, 120 superimpose the amounts of the various waveforms selected via the adjust potentiometers for both the vertical and horizontal channels, to provide the corrected V and H drive waveforms for the tube.

FIGS. 5A-5H and 6A-6H depict various functions representing inaccuracies in the tube scan raster which require correction (column 1), a brief statement of the method of correction as implemented electronically via the scan adjustment means 34 (column 2), the scan waveform generated (column 3), the pattern scanned on the pickup tube target (column 4), and the effect of the correction applied as seen on a monitor (column 5). FIGS. 5A-5H depict various functions and associated correction waveforms known per se in prior art camera systems employing multiple pickup tubes. In the invention combination, the waveforms of FIGS. 5A-5H as well as the more sophisticated waveforms of FIGS. 6A-6H are applied to only the single pickup tube of the hybrid camera system to effect the required near-perfect scan raster.

As in all the potentiometers, adjusting the movable contact to the middle of its range provides a superimposition of equal magnitudes of the mirror image positive and negative phase outputs from the associated sawtooth, parabola or ess waveform generator, which thereby cancel each other. No output appears at the movable contact with such a potentiometer setting. As the movable contact is moved towards the positive output of the generator, correspondingly more of the positive output appears at the movable contact. Conversely, as the movable contact is moved towards the negative phase output of the generator, correspondingly more of the negative phase output appears at the center tap. At either extreme movable contact setting, the full magnitude of the positive or negative phase output generated by the particular generator appears at the potentiometer movable contact.

Figure 5A:
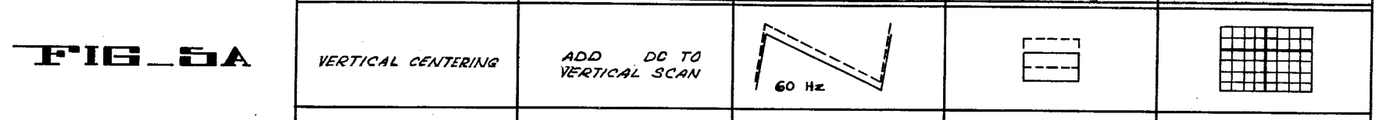
FIGS. 5A–5H are pictorial representations of inherent raster scan inaccuracies in a camera pickup tube, of typical low order scan adjusting waveforms applied to the tube deflection coils to correct such scan inaccuracies, and of the resulting corrected raster scan of cathode ray tubes in prior art systems.
Figure 5B:
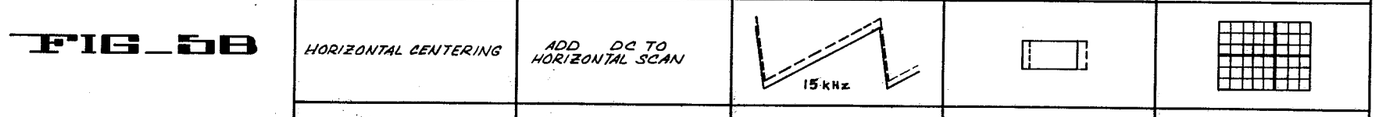
Figure 5C:
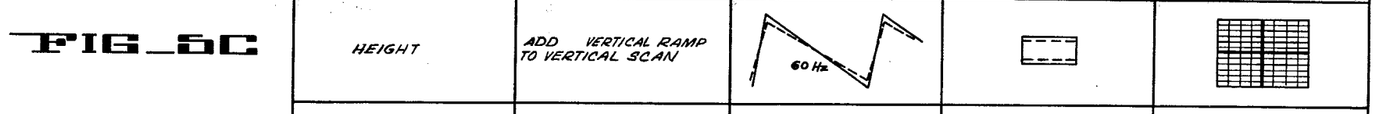
Figure 5D:
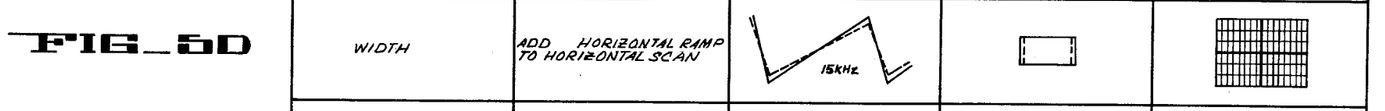

To exemplify the manner of making corrections, referring to FIG. 5C, 5D together with FIG. 4, the height and width (i.e., the vertical and horizontal size) of the scan raster may be varied by adding some vertical and/or horizontal ramp (or sawtooth) waveforms to the basic vertical and horizontal sawtooth scan waveforms. The terms ramp and sawtooth are herein generally interchangeable. Since the basic scan waveforms are themselves sawtooths, the addition of in-phase positive sawtooth waveforms as selected by the settings on the V and H size adjust potentiometers 94a, 96a, and as added together via the V and H adder amplifiers 118, 120, provides larger amplitude V and H deflection current waveforms to the scan yoke 33, and thus a larger scan raster. On the other hand, if the V or H size adjust potentiometer 94a, 96a is adjusted to provide an out-of-phase negative sawtooth, the addition thereof with the basic V or H scan waveform respectively provides an associated degree of cancellation of the latter. This results in an actual V or H scan waveform which has a decreased amplitude relative to the amplitude of the basic scan waveform, and thus a scan raster of decreased height or width, respectively.

In FIG. 5A, 5B adjustment of the V and/or H centering adjust potentiometers 125, 126 provides an increasing and/or decreasing shift in the DC level of the basic V and/or H scan sawtooth waveforms (column 3) applied to the scan raster to shift the raster accordingly (columns 4, 5).

Figure 5E:
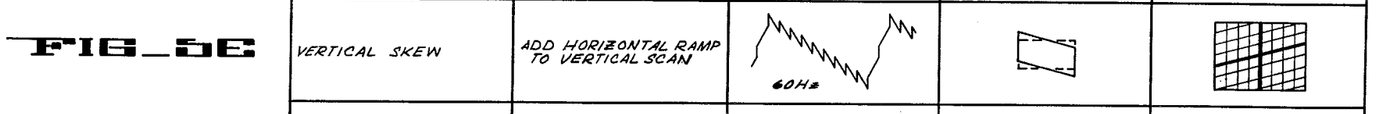
Figure 5F:
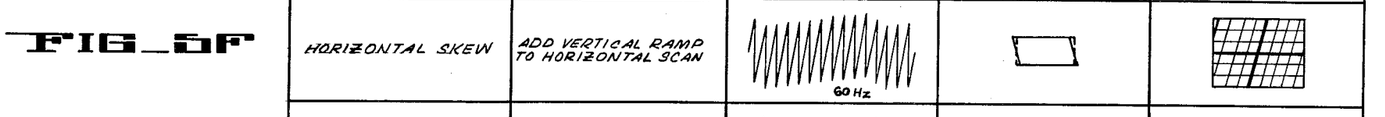

In FIGS. 5E, 5F adjustment of the H and/or V skew adjust potentiometers 94b, 96b respectively, results in adding a selected horizontal rate ramp to the basic V scan waveform (column 3) whereby an H ramp is superimposed on the V scan waveform, and a V ramp is superimposed on the H ramp waveform. This causes a corresponding vertical or horizontal parallelogram-shaped shift or distortion in the scan raster (columns 4, 5) to correct for V or H skew. The direction of V or H skew may be reversed by adjusting the associated skew adjust potentiometer to provide an amount of the opposite phase of ramp corresponding to the sense and magnitude of skew correction needed.

Figure 5G:
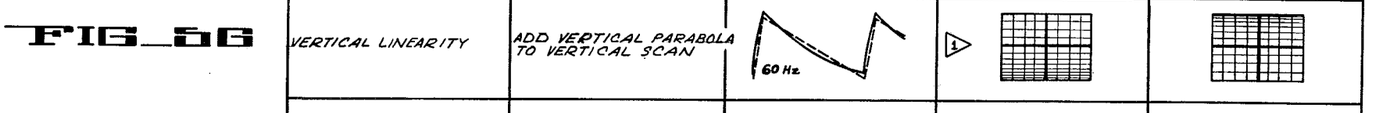
Figure 5H:
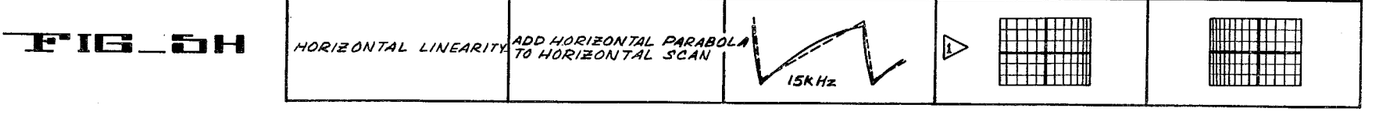

In FIGS. 5G, 5H adjustment of the V and/or H linearity adjust potentiometers 98a, 100a results in adding a vertical parabola to the basic V scan waveform, and/or a horizontal parabola to the basic H scan waveform, and/or a horizontal parabola to the basic H scan waveform (column 3). This provides a shift of the picture center with respect to its edges to correct for linearity errors in the scan raster (columns 4, 5).

Figure 6A:
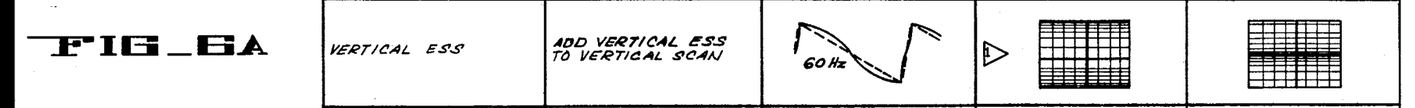
FIGS. 6A–6H are pictorial representations similar to those of FIGS. 5A–5H, but depicting further raster scan inaccuracies, and the more sophisticated, high order, scan adjusting waveforms applied to the camera pickup tube deflection coils in accordance with the invention combination, and further showing the more precisely corrected scan raster which, in turn, provides the near-perfect tube scan geometry.

The functions of FIGS. 6A–6H provides a further correction sophistication not generally required when matching the multiple tubes of prior art camera systems. Thus in FIG. 6A, 6B adjustment of the V and/or H ess adjust potentiometers 102, 104 provides a selected amount and phase of ess waveform which is added to the V and/or H scan waveform (column 3) via the V and/or H adder amplifiers 106, 108 respectively. This generates an ess correction waveform resembling a sinewave function which corrects for a sinewave type distortion in the scan raster (columns 4, 5). To this end, as shown in FIG. 6A, column 3, the addition of a positive phase of V ess to the basic V scan sawtooth is provided by moving the movable contact of the V ess adjust potentiometer 102 towards the positive phase output thereof an amount corresponding to the amplitude of positive phase V ess required to correct the existing V ess error. The raster is scanned with the horizontal lines closer together at the top and bottom portions of the raster, and further apart along the middle vertical portion of the raster (column 4). The opposite effect can be obtained by moving the movable contact towards the negative phase output of the V ess generator 90.

Figure 6B:
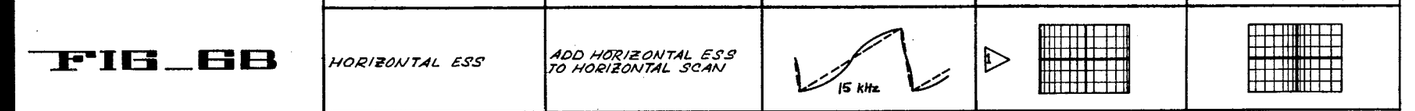
Figure 6C:
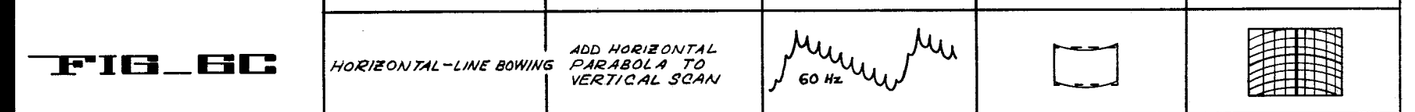

The H ess errors may be corrected by an analogous adjustment of the H ess adjust potentiometer 104, as depicted in FIG. 6B, wherein selected adjustment provides the specific amount and phase of ess waveform necessary to correct the error. In FIG. 6C, H line bowing errors are corrected by corresponding adjustment of the H line bowing adjust potentiometer 100b to provide the amount and phase of the H parabola necessary for addition to the basic V scan sawtooth waveform via the V adder amplifier 118. Column 3 depicts the resulting scan waveform generated by adding the H parabola to the V sawtooth via the adder amplifier 118, column 4 depicts the pattern scanned on the tube target, and column 5 the effect of the correction applied.

Figure 6D:
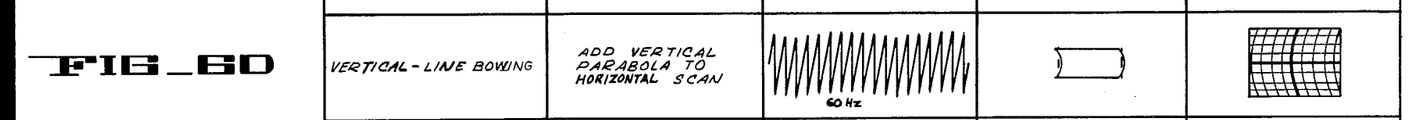

FIG. 6D depicts the analogous effects of adjusting the V line bowing adjust potentiometer 98b to provide the addition of a V parabola to the basic H scan sawtooth waveform. A resulting scan waveform is depicted in column 3, and the effects and correction thereof are depicted in column 4, 5.

Figure 6E:
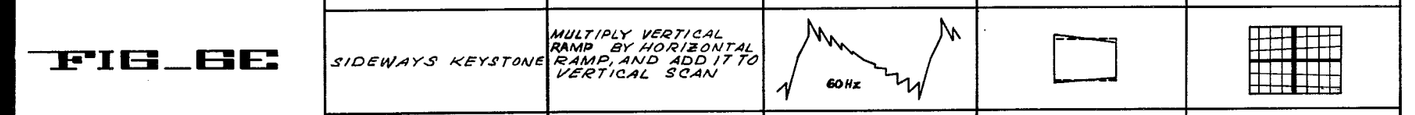
Figure 6F:
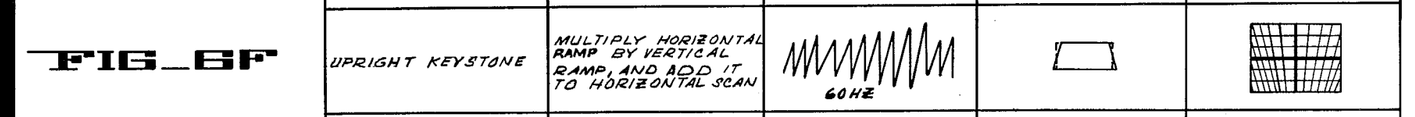

In upright keystone correction, FIG. 6F, the upright keystone adjust potentiometer 94c is selectively adjusted to provide a desired amount and phase of V sawtooth (ramp) to the H modulating waveform adder amplifier 108, which is coupled to the H sawtooth modulator 112. It is assumed that the V pincushion adjust potentiometer 98c is set at the middle so there is no output from its movable contact. The modulator 112 also receives the basic H sawtooth waveform from the H sawtooth generator 84, whereby the H ramp is modulated by the V ramp from potentiometer 94c, which in effect comprises multiplying the H ramp by the V ramp. The resulting waveform is then added to the basic H scan waveform. When fed with a positive phase, the modulator 112 generates a multiplicative or modulating envelope where the amplitude of the H sawtooth is less at the beginning of the ramp and increases towards the end thereof (column 3). That is, the modulator 112 provides an H sawtooth envelope whose amplitude increases from beginning to end of the vertical scan interval. The resulting correction provides less horizontal deflection at the top of the scan raster, and progressively increased deflection as the scan proceeds down the raster.

If a negative phase of upright keystone adjust waveform is generated by suitable adjustment of the upright keystone adjust potentiometer 94c, then the width of the horizontal scan is larger at the top of the raster, and progressively decreases towards the bottom. As is true for any of the potentiometers, if the potentiometer 94c is adjusted to its center so that the mirror image phases cancel each other out, no waveform is generated, and no correction is made for upright keystone error.

The sideways keystone function, FIG. 6E, is provided by adjusting the sideways keystone adjust potentiometer 96c, which feeds H sawtooth (ramp) to the V modulating waveform adder amplifier 106. It is assumed that the H pincushion adjust potentiometer 100c is set at the middle so there is no output from its movable contact. The V ramp is modulated via modulator 110 by the H ramp from the potentiometer 96c, and then is added to the basic V scan waveform via the V adder amplifier 118 (column 3). The resulting sideways keystone correction is depicted in columns 4, 5.

Figure 6G:
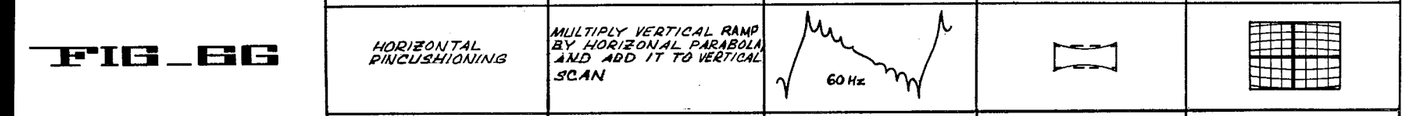
Figure 6H:
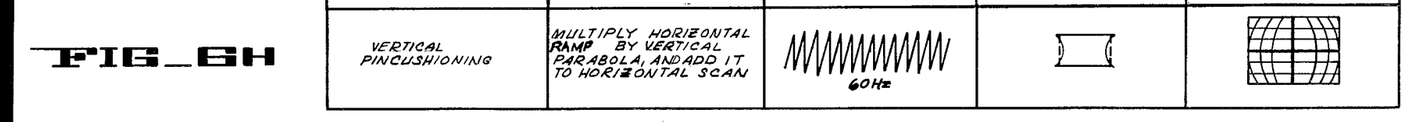

Horizontal and vertical pincushion functions are depicted in FIGS. 6G, 6H. To adjust for V pincushion correction, FIG. 6H, assuming temporarily that the upright keystone adjust potentiometer 94c is set at the middle so that there is no output, the V pincushion adjust potentiometer 98c is adjusted to apply a selected amplitude of concave-down V pincushion parabola to the H modulating waveform adder amplifier 108. From the output of this inverting amplifier, the concave-up V pincushion parabola waveform is fed to the H sawtooth modulator 112, along with the basic H scan sawtooth waveform. The resulting H scan sawtooth is modulated by the V pincushion parabola to provide an envelope wherein the amplitude thereof is greater at the beginning and end of the vertical scan interval than at the middle of the interval (column 3). This in turn makes the top and bottom portions of the raster progressively wider than the middle (columns 4, 5).

If the other phase of V pincushion parabola is selected by commensurate adjustment of potentiometer 98c, the scan raster would have a progressively larger width along the middle portion than at the beginning and end of the vertical scan interval.

Likewise, in making the H pincushion correction, assume the sideways keystone adjust potentiometer is set at the middle, whereupon the H pincushion adjust potentiometer is adjusted to supply, via the V modulating waveform adder amplifier 106, the desired amount and phase of concave-up H pincushion parabola to the V sawtooth modulator 110. The resulting V scan sawtooth is modulated by the H pincushion parabola (column 3) whereby the raster is taller toward the right and left sides thereof and narrower in the middle. Selection of the opposite phase of the H pincushion parabola provides a raster with shorter sides and a taller middle portion.

Figure 7:
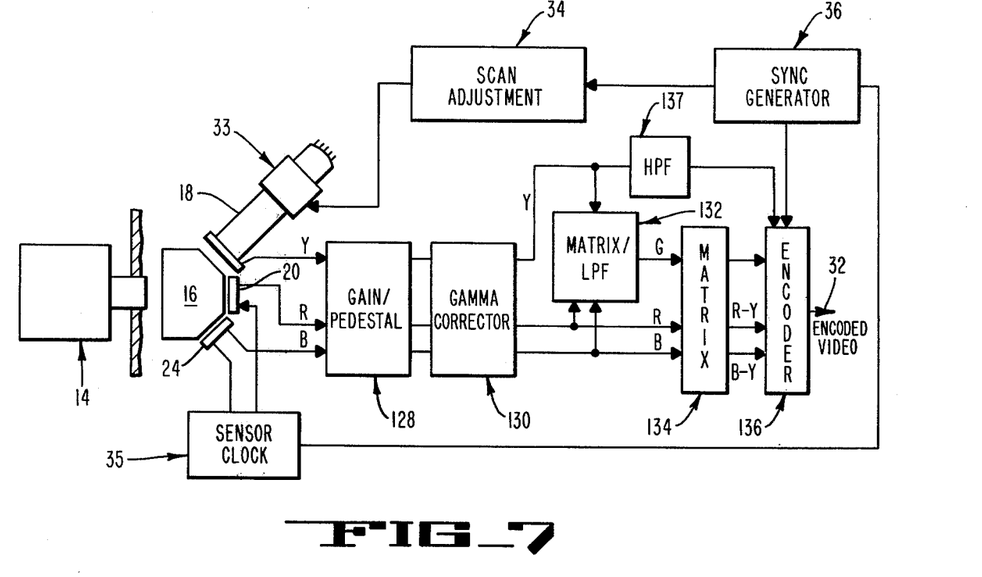
FIG. 7 is a block diagram of an alternative embodiment of the invention combination of FIGS. 1 and 2, employing a pickup tube and two solid state sensors.

Referring now to FIG. 7, an alternative embodiment of the hybrid video camera is depicted which includes the single pickup tube 18 and the two solid state image sensors 20, 24 for detecting red and blue color images. The sensors 20, 24 provide the red and blue color signal in response to the clock pulses thereto from the clock 35 as heretofore described. The tube 18 generates the luminance signal Y in response to the scan adjustment means 34, and in synchronism with the sensor scan rate as coordinated by the sync generator 36. The Y, R, B signals are fed to a gain/pedestal circuit 128 and thence to a gamma corrector circuit 130. The processed luminance signal is fed, along with the processed R, B signals, to a low pass filter 132, which is actually part of a matrix circuit 134. The R and B signals are also fed to the low pass filter 132. The G signal is obtained from the luminance signal by subtracting the R, B in given proportions therefrom. The low pass filter 132 attenuates the high frequency response of the luminance channel to match that of the red and blue channels from sensors 20, 24. The matrix circuit 134 (and 132) provides the color component signals R-Y and B-Y, which are fed to an encoder circuit 136. The processed luminance signal from the gamma corrector circuit 130 is also fed to the encoder 136 via a high pass filter 137 which provides the luminance high-resolution components for the encoder without affecting the colorimetry, i.e., without the Livingstone's error of a four tube camera. The encoder generates the encoded composite video signal on output 32 in response to clocking via the sync generator 36, as generally explained in FIGS. 1, 2.

The additional components, e.g., the gain/pedestal, gamma corrector, matrix and encoder circuits 128–136 operate essentially in the manner described in the previous figures and in the pertinent references of previous mention.

Figure 8:
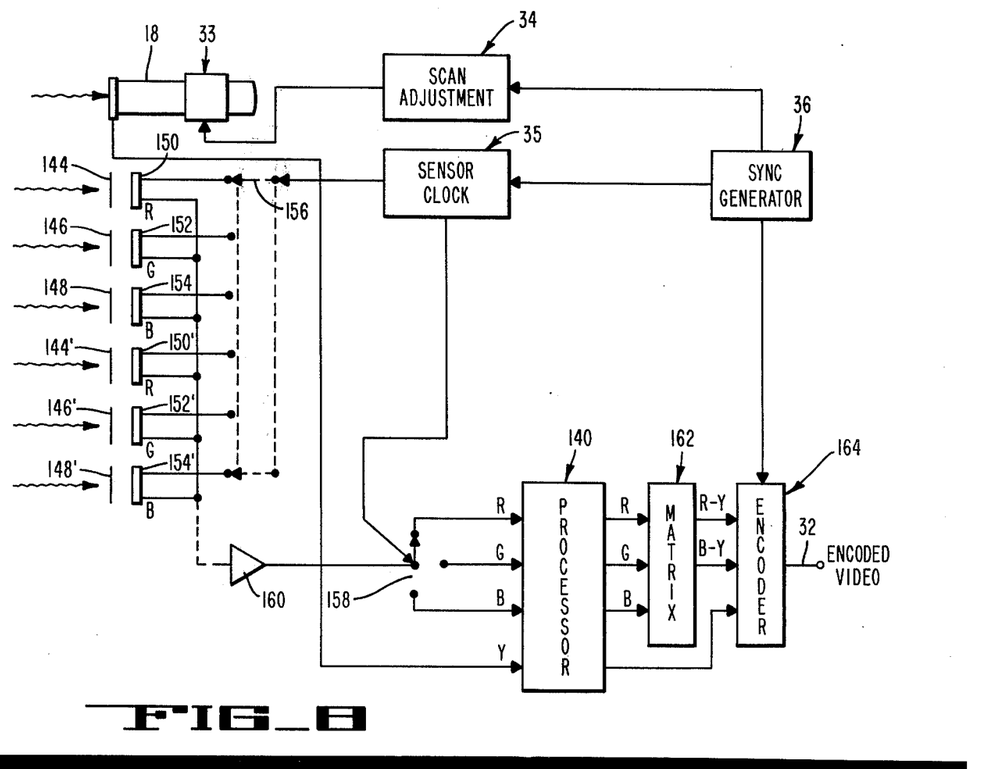
FIG. 8 is a block diagram of yet another embodiment, employing a pickup tube and one solid state sensor.

FIG. 8 depicts a further embodiment of the hybrid video camera employing the single pickup tube 18 with a single solid state image sensor 138. The tube generates the usual luminance signal which is fed to video processor means 140 formed of a preamplifier, gain/pedestal circuit and a gamma corrector circuit as in the previous embodiments. The sensor 138 is modified to include a striped filter 142 which is superimposed or otherwise placed over the sensor whereby; the first stripe is a red filter 144 and is disposed in register with a red photoelement 150 of the sensor; the second stripe is a green filter 146 disposed in register with a green photoelement 152, and the third stripe is a blue filter 148 disposed in register with blue photoelement 154. The sequence of the RGB filter stripes is repeated across the face of the sensor as depicted by RGB stripes 144', 146', 148', disposed in register with photoelements 150', 152', 154', respectively. The photoelements 150, 152, 154, 150', 152', 154', etc., are clocked at a selected scan rate commensurate with the scan rate of the tube 18 by the clock 35, which in turn is coordinated by the sync generator 36. The scanning is shown here as performed by an electronic clock stepping switch 156. The RGB signals are sequentially fed to an electronic synchronous switch 158 via a preamplifier stage 160. The switch 158 is stepped by the clock 35 in synchronism with the stepping of the clock stepping switch 156, whereby the signals from the red photoelements 150, 150', etc., are fed to the red contact, the signals from the green photoelements 152, 152', etc., are fed to the green contact, and the signals from the blue photoelements 154, 154', etc., are fed to the blue contact, of the synchronous switch 158. The RGB signals are fed via the switch 158 to the processor means 140 along with the luminance signals from the tube 18. The processed signals are fed to a matrix circuit 162, and thence as R-Y, B-Y to an encoder 164 along with the processed luminance signal, which encoder generates the encoded composite video output in response to synchronizing signals from the sync generator 36. The scan adjustment means 34 provides the tube scan rate as well as the various scan correction waveforms for producing the near perfect tube scan raster of previous description.

I claim:

1. A hybrid television color camera including a lens and an optical prism for separating the luminance from selected chrominance components and for generating luminance and chrominance signals respectively therefrom, and further including video signal processing means for generating an encoded composite video color signal from the luminance and chrominance signals, comprising the combination of;

a single high-resolution pickup tube including an electron beam scan and a scan yoke and disposed to receive the luminance component of a given image and to generate a luminance signal of the order of 4.2 and greater megaHertz bandwidth;

low-resolution solid state sensor means having an array of sensor elements of near-perfect geometry, disposed in selected arrangement with the single pickup tube to receive the selected chrominance components of the same given image and to generate respective chrominance signals of bandwidths lower than that of the luminance signal;

scan adjustment means coupled to the scan yoke of the high-resolution tube to apply a correction waveform thereto to generate a near-perfect tube scan raster geometry which conforms to the near-perfect geometry of the sensor means; and synchronizing means operatively coupled to the scan adjustment means and to the solid state sensor means for synchronizing the scan rate of the sensor means with the scan of the tube raster.

2. The hybrid camera of claim 1 wherein the scan adjustment means further includes;
  waveform generator means for generating positive and negative waveforms which are mirror images of each other;
  waveform modulator/adder means coupled to the waveform generator means for providing selected proportions and phase of the generated waveforms commensurate with the scan errors to modulate the amplitude of the deflection currents defining a composite precisely-corrected scan waveform; and
  driver means coupled to the modulator/adder means for applying the precisely-corrected scan waveform to the tube scan yoke.

3. The hybrid camera of claim 1 wherein the synchronizing means further comprises;
  a synchronizing signal generator for generating vertical and horizontal blanking pulses; and
  clock means coupled to the solid state sensor means and responsive to the synchronizing signal generator to clock the sensor means at a scan rate commensurate with the scan rate of the single pickup tube.

4. The hybrid camera of claim 2 wherein the waveform generator means includes;
  vertical and horizontal channels;
  each channel including a sawtooth waveform generator responsive to the synchronizing signal generator, a parabola waveform generator coupled to the sawtooth waveform generator, and an ess waveform generator coupled to the parabola waveform generator; and
  wherein the generators provide mirror image, positive and negative sawtooth, parabola and ess waveforms respectively.

5. The hybrid camera of claim 4 wherein the waveform modulator/adder means includes;
  vertical and horizontal channels;
  each channel including, a sawtooth waveform modulator selectively coupled to the waveform generators, and adder means coupled to the sawtooth waveform modulator respectively; and
  said driver means being coupled to respective adder means in each channel and thence to the scan yoke of the pickup tube means.

6. The hybrid camera of claim 5 further including;
  waveform adjust potentiometer means selectively coupled to each of the waveform generators in each channel thereof and including respective movable contacts which are adjustable to modify the amplitude and phase of the waveform generated by each generator commensurate with the degree of scan correction required.

7. The hybrid camera of claim 6 wherein the waveform adjust potentiometer means includes;
  upright keystone adjust potentiometer coupled across the vertical sawtooth waveform generator; and
  sideways keystone adjust potentiometer coupled across the horizontal sawtooth waveform generator.

8. The hybrid camera of claim 7 further including;
  horizontal and vertical modulator means coupled to the upright and sideways keystone adjust potentiometers respectively;
  horizontal and vertical adder amplifier means coupled to the horizontal and vertical modulator means respectively;
  wherein upright keystone scan errors are corrected by modulating the horizontal sawtooth waveform from the horizontal sawtooth generator by a given amplitude and phase of the vertical sawtooth waveform commensurate with the upright keystone error as selected on the upright keystone adjust potentiometer, and adding the resulting waveform to the composite horizontal scan; and
  sideways keystone scan errors are corrected by modulating the vertical sawtooth waveform from the vertical sawtooth generator by a given amplitude and phase of the horizontal sawtooth waveform commensurate with the sideways keystone error as selected on the sideways keystone adjust potentiometer, and adding the resulting waveform to the composite vertical scan.

9. The hybrid camera of claim 8 wherein the waveform adjust potentiometer means further includes;
  vertical line bowing adjust and vertical pincushion adjust potentiometers coupled in parallel across the vertical parabola waveform generator; and
  horizontal line bowing adjust and horizontal pincushion adjust potentiometers coupled in parallel across the horizontal parabola waveform generator.

10. The hybrid camera of claim 9 wherein;
  said horizontal and vertical modulator means are coupled to the vertical and horizontal pincushion adjust potentiometers respectively;
  wherein vertical pincushion scan errors are corrected by modulating the vertical sawtooth waveform from the vertical sawtooth generator by a given amplitude and phase of the horizontal parabola waveform commensurate with the horizontal pincushion error as selected on the horizontal pincushion adjust potentiometer, and adding the resulting waveform to the composite vertical scan; and
  horizontal pincushion scan errors are corrected by modulating the horizontal sawtooth waveform from the horizontal sawtooth generator by a given amplitude and phase of the vertical parabola waveform commensurate with the vertical pincushion error as selected on the vertical pincushion adjust potentiometer, and adding the resulting waveform to the composite horizontal scan.

11. The hybrid camera of claim 9 wherein;
  said horizontal and vertical adder amplitier means are also coupled to the vertical and horizontal line bowing adjust potentiometers respectively;
  wherein vertical line bowing errors are corrected by adding a given amplitude and phase of the vertical parabola waveform commensurate with the vertical line bowing error as selected on the vertical line bowing adjust potentiometer, to the composite horizontal sawtooth waveform; and
  horizontal line bowing errors are corrected by adding a given amplitude and phase of the horizontal parabola waveform commensurate with the horizontal line bowing error as selected on the horizontal line bowing adjust potentiometer, to the composite vertical sawtooth waveform.

12. The hybrid camera of claim 6 wherein the waveform adjust potentiometer means further includes;
  vertical ess adjust potentiometer coupled across the vertical ess waveform generator; and
  horizontal ess adjust potentiometer coupled across the horizontal ess waveform generator.

13. The hybrid camera of claim 12 wherein;

said horizontal and vertical adder amplifier means are also coupled to the horizontal and vertical ess adjust potentiometers respectively;

wherein vertical ess errors are corrected by adding a given amplitude and phase of the vertical ess waveform commensurate with the vertical ess error as selected on the vertical ess adjust potentiometer, to the composite vertical sawtooth waveform; and the horizontal ess errors are corrected by adding a given amplitude and phase of the horizontal ess waveform commensurate with the horizontal ess error as selected on the horizontal ess adjust potentiometer, to the composite horizontal sawtooth waveform.

14. The hybrid camera of claim 12 wherein said waveform adjust potentiometer means further includes;

vertical linearity adjust potentiometer coupled across the vertical parabola waveform generator;

horizontal linearity adjust potentiometer coupled across the horizontal parabola waveform generator;

said horizontal and vertical adder amplifier means are also coupled to the horizontal and vertical linearity adjust potentiometers respectively;

wherein vertical linearity errors are corrected by adding a given amplitude and phase of the vertical parabola waveform commensurate with the vertical linearity errors as selected on the vertical linearity adjust potentiometer, to the composite vertical sawtooth waveform; and the horizontal linearity errors are corrected by adding a given amplitude and phase of the horizontal parabola waveform commensurate with the horizontal linearity errors as selected on the horizontal linearity adjust potentiometer, to the composite horizontal sawtooth waveform.

15. The hybrid camera of claim 12 wherein said waveform adjust potentiometer means further includes;

horizontal skew adjust potentiometer coupled across the vertical sawtooth waveform generator;

vertical skew adjust potentiometer coupled across the horizontal sawtooth waveform generator;

said horizontal and vertical adder amplifier means are also coupled to the vertical and horizontal skew adjust potentiometers respectively;

wherein vertical skew errors are corrected by adding a given amplitude and phase of the horizontal sawtooth waveform commensurate with the vertical skew error as selected on the vertical skew adjust potentiometer, to the composite vertical sawtooth waveform; and horizontal skew errors are corrected by adding a given amplitude and phase of the vertical sawtooth waveform commensurate with the horizontal skew error as selected on the horizontal skew adjust potentiometer, to the composite horizontal sawtooth waveform.

16. The hybrid camera of claim 3 wherein the solid state sensor means comprises;

red, green and blue solid state sensors disposed against the optical prism to receive therefrom the red, green and blue chrominance components, and to supply red, green and blue video signals to respective video processing means at a scan rate clocked by the clock means and commensurate with the scan rate of the pickup tube.

17. The hybrid camera of claim 16 wherein;

the sensors include a selected number of sensor elements in each horizontal row;

the sensors are clocked with a clock pulse rate which is 15,750 pulses per second times the number of sensor elements per row; and wherein the first clock pulse for each row is referenced to the start of each tube scanning line.

18. The hybrid camera of claim 3 wherein the solid state sensor means comprises;

red and blue solid state sensors disposed against the optical prism to receive the red and blue chrominance components respectively, and to supply red and blue video signals to respective video processing means at a scan rate clocked by the clock means and commensurate with the scan rate of the pickup tube.

19. The hybrid camera of claim 3 wherein the solid state sensor means comprises;

a single solid state sensor disposed against the optical prism and including alternate red, green and blue photoelements;

red/green/blue filter means disposed between the prism and the sensor and including alternate red, green and blue filter stripes in register with respective red, green and blue photoelements of the sensor;

clock stepping switch means for sequentially clocking the red, green and blue photoelements in response to the clock means to generate consecutive series of red, green and blue video signals via the single sensor; and synchronous color switch means coupled to the alternate red, green and blue photoelements and responsive to the clock means to direct the red, green and blue video signals to respective red, green and blue channels in the video processing means.

* * * * *